Figure 1:
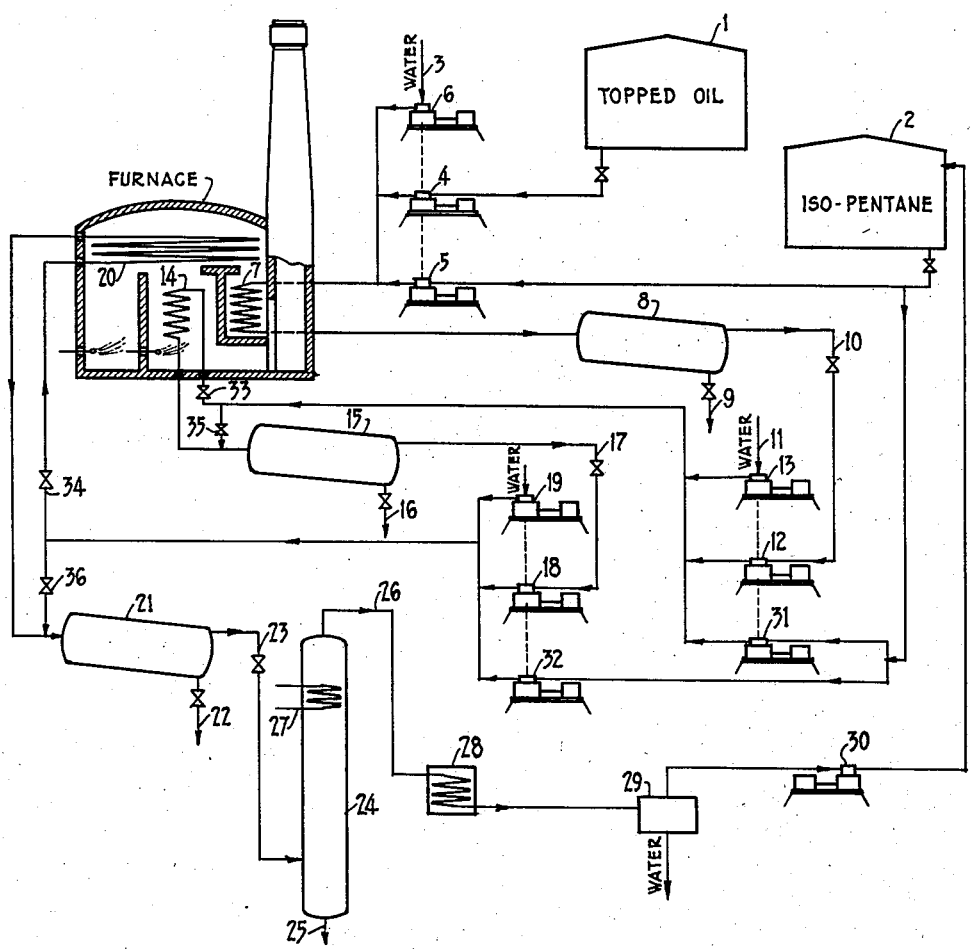

Jan. 23, 1940.  E. S. HILLMAN ET AL  2,188,045

METHOD OF SEPARATING HIGH MOLECULAR MIXTURES

Filed Feb. 8, 1937

INVENTORS: Eric Stanley Hillman
Veron Lantz
BY THEIR ATTORNEY

Patented Jan. 23, 1940

2,188,045

UNITED STATES PATENT OFFICE 2,188,045

METHOD OF SEPARATING HIGH MOLECULAR MIXTURES

Eric Stanley Hillman, Berkeley, and Vernon Lantz, Oakland, Calif., assignors to Shell Development Company, San Francisco, Calif., a corporation of Delaware Application February 8, 1937, Serial No. 124,782

12 Claims. (Cl. 196—13)

This invention pertains to a method of separating mixtures of high molecular substances into two or more fractions having different chemical and/or physical properties, by means of a low molecular treating agent under paracritical conditions.

It is known to cause the fractionation of high molecular mixtures which are liquid at least under the conditions of the process, or which may be brought into the liquid state by being dissolved in a suitable solvent, which as mineral oil fractions, shale oils, and other hydrocarbon and nonhydrocarbon mixtures, particularly coal tar, animal and vegetable oils, like linseed oil, voltolized rapeseed oil, neat's-foot oil, etc., by dissolving in the initial mixture a low molecular treating agent, such as methane, ethane, carbon dioxide, at a paracritical temperature for the low-molecular agent, under sufficient pressure to dissolve an effective quantity of the treating agent in the mixture to cause its internal pressure and/or its density to be lowered sufficiently to cause "demixing" thereof, i. e., to cause the initial mixture to separate into two liquid phases, of which the lighter liquid phase contains the greater portion of the treating agent and those components of the initial mixture having the lower internal pressures and/or the lower molecular weights, while the heavier phase consists predominantly of the components of the initial mixture which have higher internal pressures and/or higher molecular weights. The term "paracritical temperature" is, in the present specification and claims, used to designate a temperature slightly, spec., not over about 40°, below the critical temperature, or at the critical temperature, or above the critical temperature of the low molecular treating agent. Such a process is generally carried out in the presence of a solubility enhancing solvent which is liquid under the conditions of the treatment and has a molecular weight intermediate to those of the components of the mixture and the treating agent employed. Thus, one part of a lubricating oil may be dissolved in about two to ten parts of liquid propane or butane, or a fraction rich in these hydrocarbons, and (if desired, after the removal of the precipitated asphaltic materials) methane or natural gas, or carbon dioxide may be dissolved in the resulting liquid solution, at pressures from about 30 to 200 atmospheres, to cause the formation of two liquid phases. Such a process is efficaciously carried out stepwise by increasing the pressure in stages to successively dissolve more of the low molecular treating agent, the material separated after each increase in pressure being removed from the lighter liquid phase before the next increase in pressure. In this manner a series of fractions having different properties may be obtained.

Since the fractionation of liquid or liquefied high molecular mixtures by means of low molecular treating agents in the paracritical state depends upon the decrease in the density of the initial solution, it is also possible to operate the process by manipulating other variables besides the concentration of the treating agent in the solutions. For example, it is possible to dissolve initially a large quantity of the treating agent in the initial liquid or in its solution in a suitable solvent, and to apply a pressure great enough to prevent the expansion of the resulting solution to a degree sufficient to cause phase separation (or to cause only a small amount of heavy material to be separated initially) and to cause the successive precipitation of fractions from the homogeneous light liquid phase by a step-wise reduction of the pressure. The temperature in such a process may be constant or variable. It is also possible to produce a progressive reduction in the density of a homogeneous liquid phase by increasing the temperature, the pressure being either constant or variable, and sufficiently high to prevent a substantial quantity of the treating agent from escaping from the solution in the form of a vapor.

It is a limitation of such processes that the low molecular treating agent must have a critical temperature which is not too high, since it is necessary to operate at temperatures at which the low molecular treating agent is in its paracritical state, and since at higher temperatures the components of the initial high molecular mixture are inherently more miscible with one another. Thus, when iso-pentane, having a critical temperature of 187.8° C. is employed as the treating agent, only a very small amount of definitely asphaltic material can be separated from mineral lubricating oil, phase separation between the oily constituents being difficult or impossible in view of the high temperature necessary for the process. The use of treating agents having higher critical temperatures is, however, often desirable, since they may be employed mixed more intimately with the initial materials, due to their increased solubility in the high molecular mixtures. Or their use may be desirable in a fractionation step as an integral portion of a high temperature process without necessitating cooling in order to effect the required separation by one of the known methods previously outlined. Moreover, the properties of the fractions obtained by such a process is influenced by the nature of the treating agent employed, and the use of these treating agents often makes it possible to obtain fractions of compositions normally obtained by the agents heretofore employed.

In accordance with the present invention, it was found that substantially water-insoluble high molecular mixtures may be effectively treated with low molecular, preferably water-immiscible treating agents having higher critical temperatures, for example, between about 130° C. and 350° C., by carrying out the process in the presence of water or a highly polar, water-soluble liquid having a critical temperature higher than about 50° C. above the temperature of the process, such as methyl- or ethyl-alcohol. Mixtures of water and such liquids may also be employed.

The process may be operated according to any of the above described modes of operation, i. e., by varying the concentration of the treating agent, and/or by varying the pressure and/or by varying the temperature. As regards the introduction of the water, several methods may be applied.

Since only a small amount of water has a marked effect upon the solubility characteristics of the systems, a small quantity of water, from 0.1% to 10% of the weight of the treating agent, may be injected in the form of a finely divided spray, the water being generally liquid under the conditions of the process; it may, however, also be introduced in the form of steam, generally at temperatures somewhat above the temperature of the treatment, since under the conditions of the present process the quantity required by the process would dissolve and the rest would condense water as in the liquid state. This small amount of dispersed water will be readily dissolved in the treating agent in its paracritical state, and it may be added to the treating agent either before or after it is brought to the temperature of the process. In this connection it should be noted that treating agents which, under normal conditions are substantially water-immiscible, dissolve appreciable amounts of water in the paracritical state. For example, hexane, in the region from 190 to 235° C., and from 25 to 35 atmospheres pressure, dissolves from 2 to 5 weight per cent of water.

According to another method, an excess of water may be introduced into the system, in which case the water will be dissolved in the solution of the initial mixture and the treating agent in an amount depending upon the solubility of the water under the conditions of the process, the undissolved water forming an additional liquid phase, and having no effect upon the operation of the process.

When the process is operated in several stages, water may be added in each stage, but a single addition of water may be sufficient.

The process may be further understood from the following examples, considered in connection with the drawing which is, however, presented merely for the purpose of illustrating the application of the present invention, and not for the purpose of restricting the scope of the invention, since numerous changes may be made therein without departing from the spirit and scope thereof.

*Example I*

Figure 1 is a flow diagram showing the application of the process to the treatment of topped crude with iso-pentane. Topped crude from the tank 1, iso-pentane from the tank 2, and water from the inlet 3 are fed through proportioning pumps 4, 5 and 6, in a suitable ratio, as, for example, 7 : 20 : 1 by weight, respectively, and heated in a coil 7 to a temperature of about 195° C. under sufficient pressure to maintain the mixture in the liquid state. The resulting mixture is fed to a settling chamber 8, where asphaltic material is separated through an outlet 9 from the solution of lighter oil and iso-pentane, some of the water remaining in solution in the lighter phase, and some water being removed with the heavy material as an additional phase. The lighter phase, containing the greater part of the iso-pentane is withdrawn at 10 and mixed with a small quantity of water from the inlet 11 by means of proportioning pumps 12 and 13, about 5% of water, based on the solution withdrawn at 10 being generally ample. The resulting mixture is heated in the coil 14 to a temperature of about 208° C., and again separated into liquid phases in a settling chamber 15, from which a heavy oil and excess water (if any) are removed at 16, and the lighter liquid phase is withdrawn at 17. The latter is again mixed with about 5% of water, by means of proportioning pumps 18 and 19, and the resulting mixture is heated in the coil 20 to about 215° C. and the phases are separated in the settling chamber 21. An intermediate oil, together with excess water (if any), is withdrawn at 22, and the lightest oil, together with iso-pentane and dissolved water is withdrawn at 23. The latter is fed into a fractionating column 24 in which the pressure is reduced, causing the light oil to be withdrawn as a bottom product at 25, while the iso-pentane and water are vaporized and withdrawn at 26, the temperature of the column being controlled by a cooling coil 27. The vapors, after being condensed in a condenser 28, are fed to a decanting vessel 29, where the water is removed from the iso-pentane, and the latter is returned to the tank 2 by means of a pump 30.

Similar distilling and decantation units may be provided for the fractions withdrawn at 9, 16 and 22. It should be noted that the pressures in the coils 7, 14 and 20, sufficient to prevent the vaporization of a substantial quantity of iso-pentane or water are maintained by means of the proportioning pumps. It may often be desirable to introduce additional iso-pentane through the proportioning pumps 31 and 32. While, in the above example, temperatures near the critical temperature of iso-pentane were employed (necessitating pressures from about 700 to 900 pounds per square inch), it is also possible to employ slightly lower temperatures or temperatures further above the critical temperature of iso-pentane, higher pressures being then necessary.

If preferred, the oil, water, and iso-pentane may be separately heated before being mixed, thereby avoiding the necessity of providing flow velocities in the heating coils sufficient to scour out materials which are precipitated therein, but this is not essential when the oil has been previously deasphalted.

According to a modification of the above example, the coils 14 and 20 may be eliminated, and the process operated at a constant temperature, the density of the oil-iso-pentane-water solution being progressively lowered by the introduction of additional quantities of iso-pentane, through the proportioning pumps 31 and 32, the valves 33 and 34 being closed, and the valves 35 and 36 being opened for this purpose. Water may or may not be added subsequent to the first addition through the pump 6. The pressure may be maintained constant, although it is simpler to provide an excess of iso-pentane, and to regulate the quantity of gaseous iso-pentane dissolved by regulating the pressure, thereby necessitating a higher pressure in each successive stage.

Example II

Figure 2:
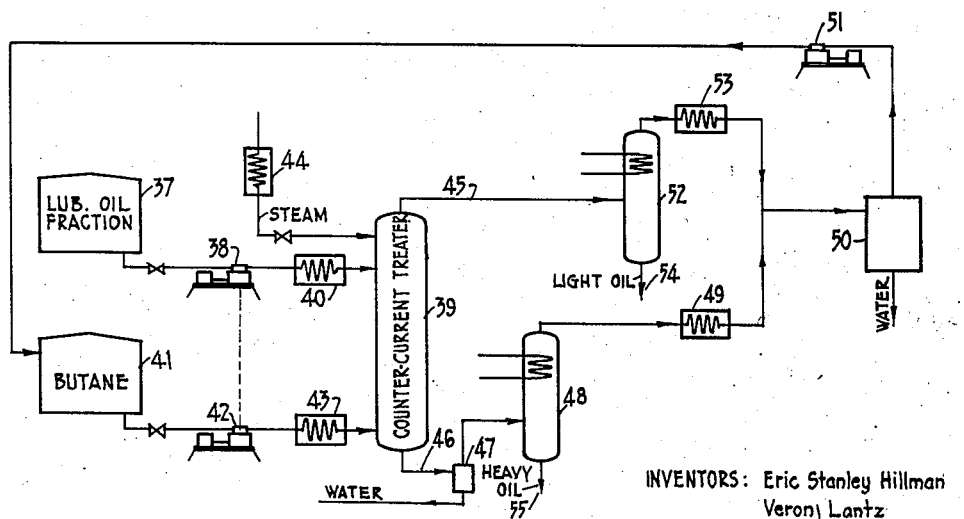

Figure 2 is a flow diagram showing the application of the process to a countercurrent method of treating a deasphalted lubricating oil fraction with butane. Lubricating oil from the tank 37 is introduced by means of a pump 38 into one end of a countercurrent contact apparatus 39, which may comprise a series of alternate mixing and settling zones, or a vertical tower provided with means for aiding the contact of the fluids flowing therein. The oil is initially heated by flowing through a heating coil 40 to a temperature between about 130° C. and 180° C. Butane from the tank 41 is introduced at the other end of the apparatus 39, by means of a pump 42, being brought to the desired temperature by a heating coil 43. The temperature at which the butane is introduced into the column may be above or below, or approximately the same as that at which the oil is introduced; one may, for example, so regulate the temperature of the butane that the end of the column near which the butane is introduced is from 10 to 40° C. cooler than the other end, whereby a temperature gradient is maintained. The temperature in the column may, however, be uniform. The relative quantities of butane and oil may vary within wide limits, the preferred range being one part of oil to between two to eight parts by weight of butane; about 1-5% of weight of superheated steam, based on the butane, or an excess of steam, is heated in the heating coil 40 and introduced into the column at a suitable point, where it is condensed to water. The water may, of course, be introduced in the form of a liquid, and may be introduced at any point in the apparatus, as at an intermediate point, or together with the oil or the butane. In the latter case the quantity of water near the top of the column will be less than that necessary to saturate the hydrocarbon solution if a temperature gradient is employed, and for this reason it is preferable to operate as illustrated in the drawing.

In the apparatus 39 the butane dissolves in the oil. Aided by the water, it causes the formation of two oil-containing liquid phases, the lighter one of which contains the lighter and/or more paraffinic constituents, together with the major part of the butane, and the heavier phase containing the heavier and/or more aromatic or asphaltic oil. These two phases flow countercurrently to one another, the heavy phase being withdrawn at 46 and the lighter phase at 45. A third water phase may often be present, if the quantity of steam introduced exceeds the amount which may be dissolved in the butane-oil solution and is withdrawn at 46, together with the heavy oil phase. It may be separated from the oil by means of a trap 47, and the heavy oil phase may then be flashed to remove butane and entrained water in a flashing column 48, the vapors being condensed in the condenser 49 and separated into butane and water layers in the decanting vessel 50, the butane being returned to the tank 41 by means of a pump 51. The light liquid phase may be similarly treated in a flashing column 52 and condenser 53, the condensate being mixed with the condensate from the column 48. Light and heavy oils are withdrawn at 54 and 55 respectively.

If desired the above treatment may be repeated, as by flowing the liquid phase obtained at 45 countercurrently to additional butane at a higher temperature and/or pressure, whereby the density of the oil is further reduced. Similarly, the material withdrawn at 46 may be further treated with additional butane at a lower temperature. In this way several fractions may be obtained. If desired, a different treating may be employed in the subsequent stages.

Example III 34.8 parts by weight of a Coalinga residue, 103.6 parts of isopentane, and 5 parts of water were mixed in a closed cylinder and heated to 195° C., at a pressure of 700 lbs. per sq. in.; 8 parts by weight of a very hard asphalt were precipitated, and drawn off. The temperature was further increased to 208° C., at a pressure of 858 lbs. per sq. in., and water was added in excess of the quantity necessary to saturate the isopentane, causing the formation of two new liquid phases, the lower phase yielding, upon separation of the isopentane, 34.2 parts by weight of a dark colored oil, and the upper phase yielding 56.0 parts by weight of a greenish oil.

When the above steps were repeated under similar conditions, but without the addition of water, no definite phase separation occurred; a small amount of hard asphalt was precipitated, and oil remaining in solution had a black color.

Example IV 36 parts by weight of a residual oil having a viscosity of 205 sec. Say. Univ. at 210° F. and 109 parts of a hexane fraction boiling between 50° C. and 78° C. (having a pressure of 725 lbs. per sq. in. at 220° C.) were mixed in a closed chamber and heated to 220° C. Water was then pumped in until a constant pressure of 895 lbs. per sq. in. was reached (after 9 parts of water had been added). No phase separation occurred at this temperature. The mixture was further heated to 242° C., and water was again added until a constant pressure of 1125 lbs. per sq. in. was obtained; the mixture then separated into two liquid phases, each saturated with water. The mixture was allowed to stratify, and the oil was continuously drawn off from the bottom of the chamber; the oil in the heavy layer, amounting to about 15% of the initial oil, had a viscosity of 432 sec. Say. Univ. at 210° F., and the oil in the light liquid layer, amounting to about 70%, had a viscosity of 297 sec. About 15% of the oil, having a viscosity of 50.6 sec., was dissolved in the dense vaporized hexane phase, and withdrawn with the residual gas phase.

The present process may be employed with any treating agent having a critical temperature below about 350° C., but is particularly useful in connection with treating agents having critical temperatures above 130° C. and below 270° C., since satisfactory phase separation can usually be obtained even without water with lighter treating agents; the separation obtained with such lighter agents can, however, often be improved by the use of water. On the other hand, treating agents having critical temperatures above 270° C. require such high temperatures that phase separation is often difficult, even with water. The temperatures to be employed in the present process are normally not lower than about 15° C. below the critical temperature of the treating agent, except for the preliminary precipitation of asphaltic material, due to the inherent increase in the mutual solubility of the components' high molecular mixtures with one another at elevated temperatures, and will in most cases, particularly with the treating agents of critical temperature above 200° C., lie above the critical temperature, preferably not more than 50° C. above such temperature, nor in most cases above 350° C. The material being treated, or a component thereof, should be in its normal liquid state under the conditions of the process, i. e., it should be substantially below its own critical temperature.

The treating agent employed should, preferably, be chemically inert with respect to the materials being treated, the separation effected in the present process being of a physical and not a chemical nature.

Examples of suitable treating agents are: normal and branched chain butanes, pentanes, hexanes, and heptanes, the corresponding olefines, their mixtures, and petroleum distillates rich in these hydrocarbons, such as, for example, a butane-butylene fraction containing 96% of butane and butylene and 48% olefines, and having a critical temperature of 152° C. While it is possible to obtain the separation of oil into two liquid phases with the latter material even in the absence of water, the separation is improved when water is added. Non-hydrocarbon treating agents may, however, also be employed. Examples of these are: the aliphatic amines with critical temperatures from 130° C. to 300° C., such as methylamine and triethylamine and the halogenated hydrocarbons with the same range at critical temperatures such as methylchloride and carbon tetrachloride.

The invention may be employed in connection with the treatment of all types of mineral oils, particularly the heavier oils. It is especially useful in the treatment of hydrocarbon mixtures which are solid at ordinary temperatures, such as waxes, but it may also be applied to the fractionation of other materials, which contain non-hydrocarbons, either with or without hydrocarbon oils. Thus, the present process may be applied to the fractionation of numerous vegetable oils and waxes containing esters and fatty acids, voltolized rapeseed oil.

We claim as our invention:

1. A process for separating a high molecular weight, substantially water-immiscible mixture into portions having different properties, comprising the steps of subjecting said mixture to the precipitating action of a single treating agent which is substantially immiscible with water at ordinary temperature, has a low molecular weight and possesses a critical temperature below 350° C. under paracritical condition for said agent, said agent containing dissolved from .1 to 10% liquid water, the amount of said agent being sufficient to cause the formation of at least two non-gaseous phases containing different portions of said mixture.

2. A process for separating a high molecular weight, substantially water-immiscible mixture into portions having different properties, comprising the steps of subjecting said mixture to the precipitating action of a treating agent which has a low molecular weight and possesses a critical temperature below 350° C., under paracritical temperature condition for said agent, substantially in the absence of a water-miscible liquid selective oil solvent, said agent containing dissolved therein at least 0.1% of a modifying agent of the class consisting of water, methyl alcohol and ethyl alcohol, the amount of the treating agent being sufficient to cause the formation of at least two non-gaseous phases containing different portions of said mixture, and separating said phases.

3. The process according to claim 2 in which the temperature at which the two non-gaseous phases are separated is above the critical temperature of the treating agent.

4. The process according to claim 2 in which the high molecular mixture is a hydrocarbon oil.

5. The process according to claim 2 in which the high molecular mixture is a normally solid hydrocarbon mixture.

6. A process for separating a high molecular weight, substantially water-immiscible mixture into portions having different properties, comprising the steps of subjecting said mixture to the precipitating action of a treating agent which has a low molecular weight, is substantially water-immiscible at normal temperatures, and possesses a critical temperature between about 130° C. and 350° C., under paracritical temperature condition for said agent, said agent containing dissolved therein at least 0.1% of a modifying agent of the class consisting of water, methyl alcohol and ethyl alcohol, the amount of the treating agent being sufficient to cause the formation of at least two non-gaseous phases containing different portions of said mixture, and separating said phases.

7. A process for separating a high molecular weight, substantially water-immiscible mixture into portions having different properties, comprising the steps of subjecting said mixture to the precipitating action of a hydrocarbon treating agent which contains not less than four carbon atoms and not more than seven carbon atoms, under paracritical temperature condition for said agent, said agent containing dissolved therein at least 0.1% of water, the amount of the treating agent being sufficient to cause the formation of at least two non-gaseous phases containing different portions of said mixture, and separating said phases.

8. A process for separating a high molecular weight, substantially water-immiscible mixture into portions having different properties, comprising the steps of subjecting said mixture to the precipitating action of a treating agent which has a low molecular weight, is substantially immiscible with water at ordinary temperature and has a critical temperature below 350° C., under paracritical temperature condition for the treating agent in the presence of a quantity of water in excess of that which is soluble in the treating agent under conditions of the process, said quantity being sufficient to cause the formation of a liquid phase consisting substantially of water and two non-gaseous phases containing different portions of said mixture, and separating said non-gaseous phases one from the other.

9. A process for separating a high molecular weight oil into a plurality of fractions having different properties, comprising the steps of subjecting said oil to the precipitating action of a treating agent which has a low molecular weight and possesses a critical temperature below 350° C., under paracritical temperature condition for said agent, said agent containing dissolved therein at least 0.1% of water, the amount of the treating agent being sufficient to cause the formation of a light liquid phase containing said treating agent and a portion of the oil and a heavier phase containing a different portion of the oil, separating said phases, decreasing the density of said light liquid phase and adding a further quantity of water to it to cause its separation into at least two secondary, non-gaseous phases containing different portions of the oil, and separating the secondary phases.

10. The process according to claim 9 in which the density of the light liquid phase is lowered by increasing its temperature.

11. The process according to claim 9 in which the density of the light liquid phase is lowered by adding thereto a further quantity of treating agent.

12. A process for separating a high molecular weight, substantially water-immiscible mixture into portions having different properties, comprising the steps of counterflowing in a countercurrent extraction zone said mixture and a treating agent which has a low molecular weight and possesses a critical temperature below 350° C. under paracritical temperature condition for said treating agent, substantially in the absence of a water-miscible liquid selective oil solvent, said agent containing dissolved therein at least 0.1% of water, thereby causing the formation of counterflowing liquid phases containing different portions of said high molecular weight mixture, and withdrawing said liquid phases at spaced points in the extraction zone.

ERIC STANLEY HILLMAN.
VERNON LANTZ.